United States Patent [19]

Kato

[11] Patent Number: 4,765,970

[45] Date of Patent: Aug. 23, 1988

[54] FLAKY ZIRCONIA TYPE FINE CRYSTALS AND METHODS OF PRODUCING THE SAME

[75] Inventor: Etsuro Kato, Aichi, Japan

[73] Assignee: Nissan Chemical Industries, Ltd., Tokyo, Japan

[21] Appl. No.: 881,812

[22] Filed: Jul. 3, 1986

[30] Foreign Application Priority Data

Jul. 3, 1985 [JP] Japan ................... 60-147238
Dec. 10, 1985 [JP] Japan ................... 60-278526
Dec. 10, 1985 [JP] Japan ................... 60-278527

[51] Int. Cl.⁴ ............................... C03C 3/06
[52] U.S. Cl. ................................... 423/608
[58] Field of Search ............. 423/592, 593, 598, 608

[56] References Cited

U.S. PATENT DOCUMENTS

| | | | |
|---|---|---|---|
| 3,340,006 | 9/1967 | Mochel | 423/608 |
| 4,283,377 | 8/1981 | Fenner | 423/608 |

FOREIGN PATENT DOCUMENTS

| | | | |
|---|---|---|---|
| 3927308 | 11/1980 | Japan | 423/608 |
| 1201622 | 9/1986 | Japan | 423/608 |
| 550288 | 1/1943 | United Kingdom | 423/608 |
| 0867880 | 10/1981 | U.S.S.R. | 423/608 |

*Primary Examiner*—Asok Pal
*Attorney, Agent, or Firm*—Birch, Stewart, Kolasch & Birch

[57] ABSTRACT

Flaky zirconia type fine crystals having a lamellar structure with a thickness of less than 500 Å and a size in a direction parallel to the plane of lamellar layers of greater than five times that of the thickness, including flaky $SO_4$ ion-containing zirconia fine crystals, flaky hydrous zirconia fine crystals, monoclinic flaky zirconia fine crystals and tetragonal or cubic flaky zirconia fine crystals. These crystals may be used in making piezoelectric ceramics.

18 Claims, 4 Drawing Sheets

FLAKY ZIRCONIA TYPE FINE CRYSTALS AND METHODS OF PRODUCING THE SAME

BACKGROUND OF THE INVENTION

This invention relates to flaky zirconia type fine crystals having a lamellar structure with a thickness of less than 500 Å and with a size in the direction parallel to the plane of lamellar layers of greater than five times that of the thickness, as well as a method of producing the same.

Zirconia ($ZrO_2$ and solid-solutions thereof are hereinafter collectively referred to as zirconia) are highly refractory oxides and have various kinds of application uses such as use in fine ceramics. Particularly, ceramics containing $Y_2O_3$ and the like which are solid-solubilized therein have now been highlighted as oxygen sensors and high strength engineering ceramics, as well as widely used as the starting material for piezoelectric ceramics. Fine zirconia particles have generally been used as the starting material for the above-mentioned fine ceramics and finely powderized particles of a spherical shape have been used due to their excellent packing and sintering properties.

However, at present with respect to flaky zirconia fine particles, neither an industrial production method nor a literature disclosure for attempting an application use of these particles has been known.

The present inventor has been aware of the possibility for the specific application uses of flaky zirconia and has discovered flaky zirconia type fine crystals as a result of various experiments in accomplishing the present invention.

SUMMARY OF THE INVENTION

Accordingly, it is an object of the present invention to provide novel flaky zirconia type fine crystals.

Another object of the present invention is to provide a method of producing the novel flaky zirconia type fine crystals as described above.

As a result of extensive studies, the present inventor has found that flaky zirconia fine crystals containing $SO_4$ ions, which were previously unknown, are formed by applying a heat treatment at a temperature of from 110° to 350° C. to an aqueous acidic solution, at a pH of less than 2, wherein the solution contains from 0.1 to 1.5 g atom/liter of an aqueous zirconium salt, calculated as Zr, and contains from 0.2 to 3 g ion/liter of $SO_4$ ions. As the result of an analysis, the it has been found that fine crystals produced are flaky hexagonal or disc-like flaky crystals having a lamellar structure with a thickness of less than 500 Å and a size in a direction parallel to the plane of the lamellar layers of greater than five times that of the layer thickness. The crystals are composed of a compound mainly comprising metal ions of Zr and $SO_4$ ions in an amount of 2/5 to the number of Zr atoms.

The flaky zirconia fine crystals containing $SO_4$ ions can form flaky zirconia particles that maintain the original flaky shape by heat treatment at a temeprature higher than 600° C. which causes decomposition and desulfurization.

The present inventor has also found that flaky hydrous zirconia fine crystals with a thickness of less than 200 Å can be obtained by aging the flaky zirconia fine crystals containing $SO_4$ ions which are prepared by the method as described above in an aqueous basic solution. The flaky fine crystals show no substantial change before and after the aging when observed under powder X-ray diffractometry.

The present inventor has further found surprisingly that flaky zirconia fine crystals maintaining a tetragonal or cubic form with the thickness of less than 200 Å can be obtained also by calcining the above-mentioned hydrous zirconia crystals at a temperature of higher than 600° C.

Specifically, the flaky zirconia type fine crystals according to the present invention are of a lamellar structure with a thickness of less than 500 Å and a size in the direction parallel to the plane of lamellar layers of greater than five times that of the thickness, and include the following crystals:

Firstly, flaky zirconia fine crystals, which are composed of a compound mainly containing metal ions of Zr and $SO_4$ ions in an amount of about 2/5 to the number of Zr atoms, which have crystallographically a 6- or 3-fold axis of symmetry perpendicular to the plane of lamellar layers, in which the relative position between Zr an O is similar to that in the $ZrO_2$ crystals and in which several of the main peaks in the powder X-ray diffractometry are substantially in an identical position as that of tetragonal or cubic $ZrO_2$ crystals.

Secondly, flaky zirconia fine crystals obtained by heating to desulfurize the flaky zirconia fine crystals containing $SO_4$ ions as described above.

Thirdly, flaky hydrous zirconia fine crystals obtained by aging the flaky zirconia fine crystals containing $SO_4$ ions in an aqueous basic solution to replace and remove $SO_4$ ions.

Fourthly, flaky zirconia fine crystals obtained by calcining the flaky hydrous zirconia fine crystals.

BRIEF DESCRIPTION OF THE DRAWINGS

The above and other objects, features and advantages of the invention will become more apparent from the following description and claims taken in conjunction with the accompanying drawings, in which:

DETAILED DESCRIPTION OF THE INVENTION

As has been described above, the flaky zirconia type fine crystals according to the present invention have a lamellar structure with a thickness of less than 500 Å and a size in the direction parallel to the plane of the lamellar layers of greater than five times of that of the thickness.

The first flaky zirconia type fine crystals according to the present invention are flaky $SO_4$ ion containing zirconia fine crystals which are composed of a component mainly containing metal ions of Zr and $SO_4$ ions in an amount of about 2/5 to the number of Zr atoms, wherein the crystals have a crystallographically 6- or 3-fold axis of symmetry perpendicular to the plane of lamellar layers, in which the relative position between Zr and O is similar to that in $ZrO_2$ crystals and in which several of the main peaks in a chart of powder X-ray diffractometry are substantially at identical positions as compared to those of tetragonal or cubic $ZrO_2$ crystals. The crystals are prepared by heat treating at a temperature from 110° to 350° C. an aqueous acidic solution containing from 0.1 to 1.5 g atom/liter of a soluble zirconium salt as Zr and from 0.2 to 3 g ion/liter of $SO_4$ ions, at a pH of less than 2. More specifically, soluble zirconium salts used as the starting material for the flaky zirconia fine crystals containing $SO_4$ ions according to this invention include zirconium oxycarbonate, zirconium oxychloride, zirconium oxysulfate, zirconium carbonate, zirconium chloride, zirconium sulfate, etc. When the water-soluble zirconium salts are subjected to a heat treatment at a temperature from 110° to 350° C. in the form of an aqueous acidic solution with less than pH 2 and containing from 0.1 to 1.5 g atom/liter of Zr and from 0.2 to 3 g ion/liter of $SO_4$ ions, flaky zirconia fine particles containing $SO_4$ ions are formed. The time required for the processing ranges from one hour to five days, while varying depending on the composition of the solution and the processing temperature. A concentration of Zr in the aqueous solution of lower than 0.1 g atom/liter or a concentration of $SO_4$ ions of higher than 3 g ion/liter does not constitute a practical range in accordance with the present invention. It is preferred for obtaining satisfactory results to keep the concentration of Zr within a range from 0.2 to 1 g atom/liter, $SO_4$ ions in a range from 0.4 to 1.5 g ion/liter and the molar ratio of $SO_4/Zr$ at higher than 1.

According to an analysis, the obtained flaky fine crystals are composed mainly of a compound containing metal ions of Zr and $SO_4$ ions in an amount of about 2/5 to the number of Zr atoms. The crystals are crystallized as hexagonal plate-like or disc-like flaky crystals with a thickness of less than 500 Å and with a size in the direction parallel to the plane of lamellar layers of greater than five times that of the thickness.

Figure 2:
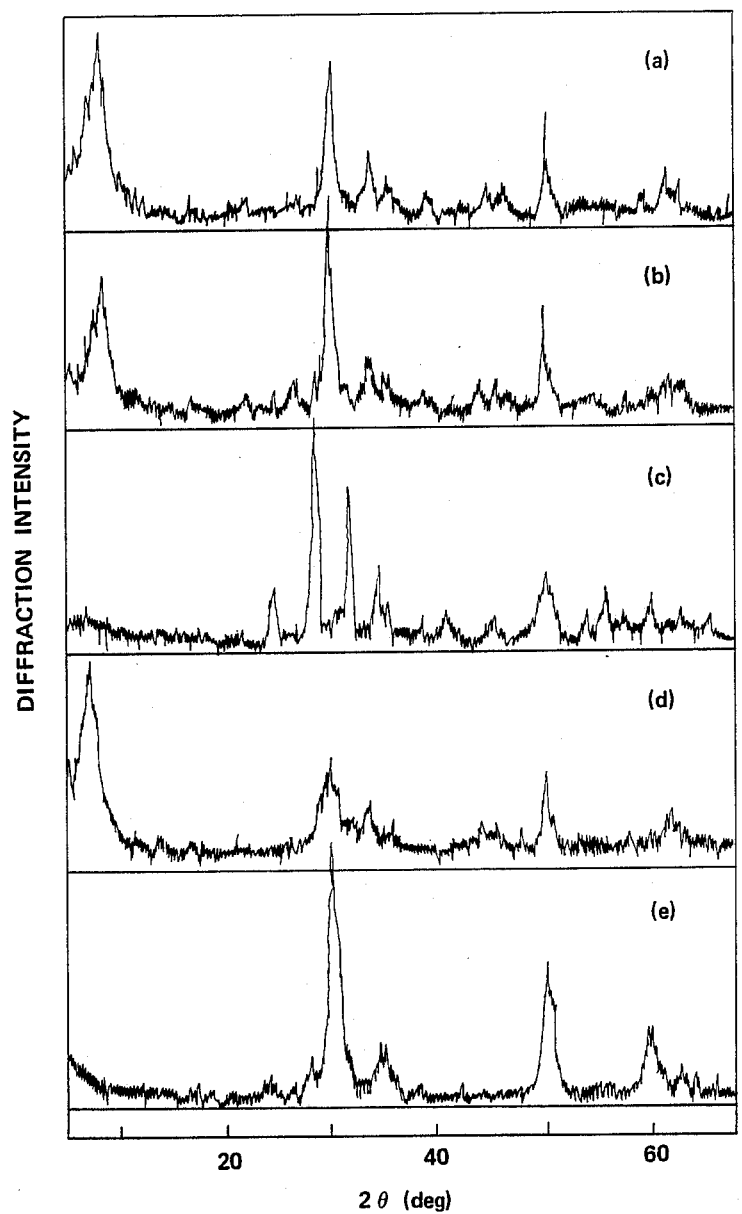
FIG. 2 shows a chart of the results of powder X-ray diffractometry (CuK$\alpha$) for various specimens, in which (a) shows the result of highly crystalline flaky $SO_4$ ion containing zirconia fine crystals according to this invention, (b) shows the result of powder prepared by calcining (a) at 600° C., (c) shows the result of powder prepared by calcining (a) at 700° C., (d) shows the result of fine crystals somewhat lower in crystallinity as compared with (a), and (e) shows the result of tetragonal $ZrO_2$ fine crystals, for comparison, prepared by calcining zirconium hydroxide at a low temperature.

According to the results of electron diffractometry, the flaky fine crystals have a crystallographically 6- or 3-fold axis of symmetry perpendicular to the plane of the lamellar layers and, as shown in the powder X-ray diffractometry results in FIG. 2(a), and have such a crystal structure that the main peaks are substantially at identical positions as compared to those in tetragonal or cubic zirconia (FIG. 2(e)). It is extremely important that the amount of $SO_4$ ions are relatively small as compared with Zr. The spatial arrangement of Zr and O is similar to that of tetragonal or cubic zirconia and the spatial density in the crystals is nearly equal to that of $ZrO_2$.

Figure 1:
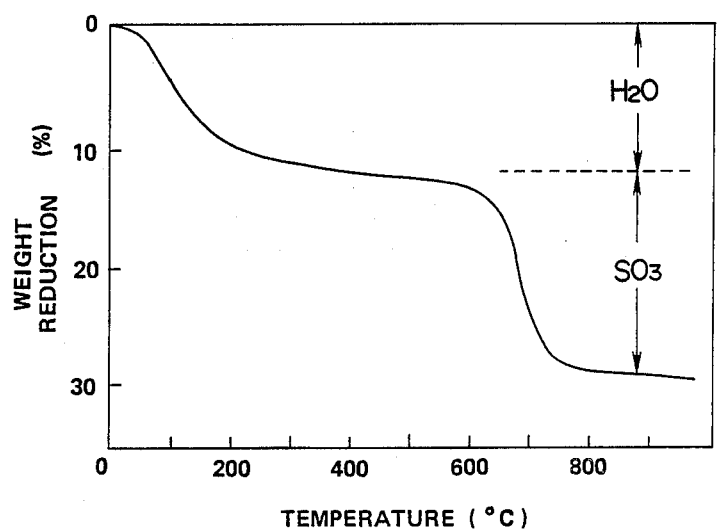
FIG. 1 shows the result of thermogravimetric analysis for the powder of flaky $SO_4$ ion containing zirconia fine crystals according to this invention.

While water incorporated is lost by heating to a temperature of 200° C. as shown in FIG. 1, the crystal structure can be preserved with no substantial change and can remain stable in air until 600° C. When the crystals are heat treated further at a higher temperature, monoclinic flaky zirconia particles of a relatively high strength can be prepared. The flaky zirconia fine crystals containing $SO_4$ ions obtained by the method according to this invention are flocculated to precipitate below a pH of about 3 and peptized at pH values of about 5 to 6 to form sols. Further, the crystals can be obtained as separate particles with no agglomeration by drying after replacement of water with an organic solvent or by freeze drying.

The second flaky zirconia type fine crystals of the present invention are monoclinic zirconia fine crystals having a lamellar structure with a thickness of less than 500 Å and a size in the direction parallel to the plane of lamellar layers of greater than five times that of the thickness. These crystals can be obtained by desulfurization of the above-said flaky zirconia fine crystals containing $SO_4$ ions through heat treatment at higher than 600° C., preferably 700° to 1000° C.

More specifically, the flaky $SO_4$ ion containing fine crystals contain water but the water is split at a temperature lower than about 200° C., in which there is no substantial change in the crystal structure, particularly, in the relationship between Zr an O. The crystal structure is maintained until a temperature of about 600° C. (FIG. 2(b)) and decomposes through desulfurization at a temperature higher than 600° C. to form monoclinic zirconia (FIG. 2(c)). Although the monoclinic zirconia fine crystals are formed into the flaky shape while leaving the shape of the flaky fine crystals before decomposition, some agglomeration occurs between the zirconia particles depending on the decomposing conditions. However, most of the agglomerations occur between the planes of the layers and the feature of the flaky shape is not lost. Individually separated flaky monoclinic zirconia fine particles with no agglomeration can be obtained by homogeneously mixing the flaky $SO_4$ ion containing fine zirconia crystals with a carbonaceous material such as a caramel solution and the like, drying and applying heat treatment to the mixture, and removing the carbonaceous material through combustion at a low temperature.

Furthermore, by causing $Y_2O_3$, CaO, etc. to be present together upon heat decomposition, these components are solid-solubilized to obtain stabilized or partially stabilized flaky zirconia fine particles. These desulfurized flaky zirconia fine particles are in the form of a hexagonal or disc-like plate shape depending on the shape of the original particles and any of these particles has sufficient shape-maintaining strength. This fine particle powder can again be dispersed in water into sols.

The third flaky zirconia type fine crystals of the present invention are flaky hydrous zirconia fine crystals mainly comprising metal ions of Zr and anions of O, in which relative positions between Zr and O are similar to those in $ZrO_2$ crystals and several of the main peaks in a chart of the results of powder X-ray diffractometry are substantially at identical positions as compared to those in tetragonal or cubic $ZrO_2$ crystals. These crystals can be obtained by aging the first flaky zirconia type fine crystals, i.e. the flaky zirconia fine crystals containing $SO_4$ ions, in a basic aqueous solution.

When the flaky zirconia fine crystals containing $SO_4$ ions as described above are subjected to the aging treatment in an aqueous basic solution with a pH higher than 8 to substitute and remove $SO_4$ ions, flaky hydrous zirconia fine crystals can be obtained. The aqueous basic solution usable herein can include aqueous ammonia solution and aqueous alkali hydroxide solution. When the $SO_4$ ions are substituted through aging, the processing time can be shortened by raising the pH of the solution or raising the processing temperature. However, a processing temperature higher than 150° C. is not favorable since the flaky shape tends to be destroyed. The processing temperature therefore is from 20° to 150° C., preferably, from 70° to 110° C. and, more preferably, from 95° to 100° C.

Figure 4:
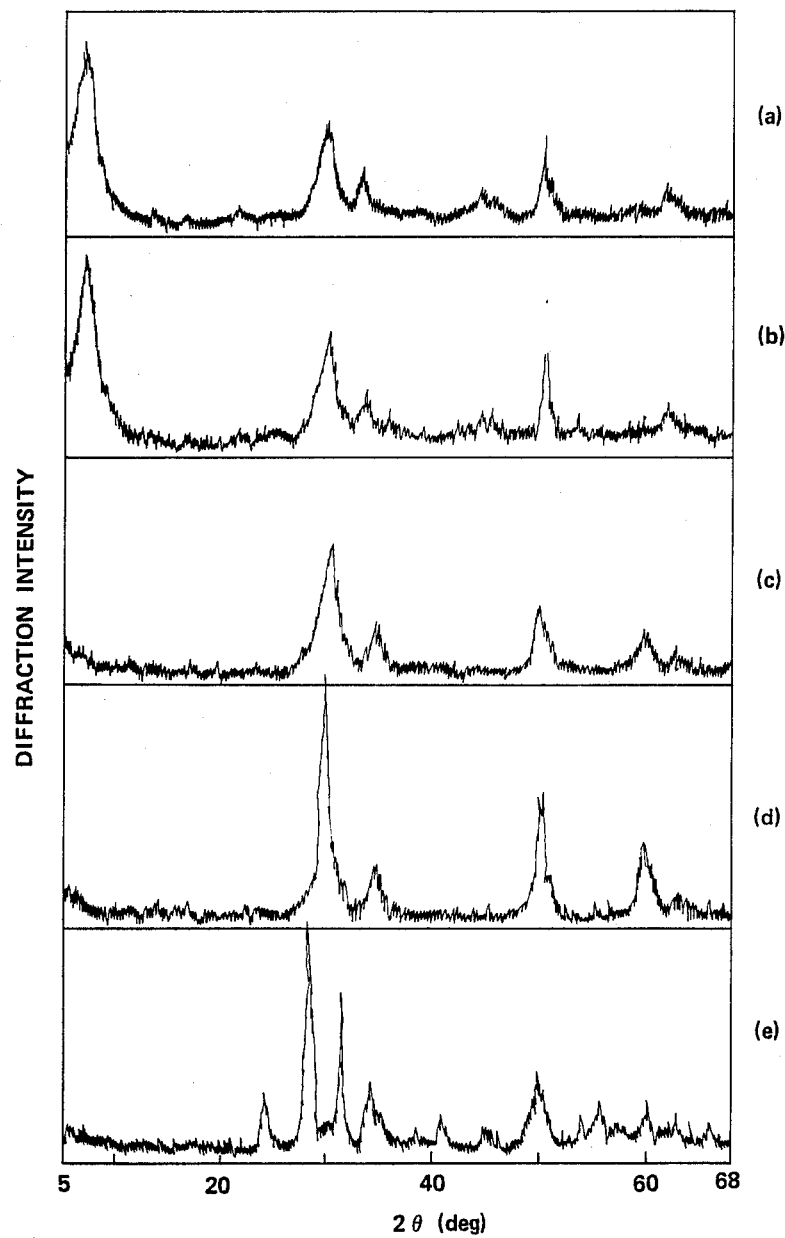
FIG. 4 shows a chart for the results of powder x-ray diffractometry (CuK$\alpha$) for various specimens, in which (a) shows the result of flaky $So_4$ ion containing zirconia fine crystals in the present invention, (b) shows the result of flaky hydrous zirconia fine crystals according to this invention, (c) and (d) show, respectively, the results of tetragonal or cubic zirconia fine crystals prepared by applying heat treatment to (b) at 700° C. and 100° C., respectively, and (e) shows the result of monoclinic zirconia fine crystals prepared by applying heat treatment to (a) at 1000° C.

The thus obtained fine crystals are those composed of a lamellar compound comprising metal ions mainly of Zr and anions mainly of oxygen, in which relative positions between Zr and O are similar to those in $ZrO_2$ crystals and several of the main peaks of the powder X-ray diffratometry chart, as shown in the chart of FIG. 4(b), are substantially at identical positions as compared to those of tetragonal or cubic type $ZrO_2$ (FIG. 4(c), and (d)). These fine crystals have a flaky shape extending in a direction in parallel to the plane of the lamellar layers with a thickness of less than 200 Å.

It is extremely important that the spatial arrangement for Zr and O of these crystals is nearly equal to that in tetragonal or cubic $ZrO_2$ crystals. While these crystals gradually lose incorporated water up to about 700° C. and are converted into tetragonal or cubic zirconia by heating as shown in FIG. 3, no substantial change is observed in the particle shape.

Figure 3:
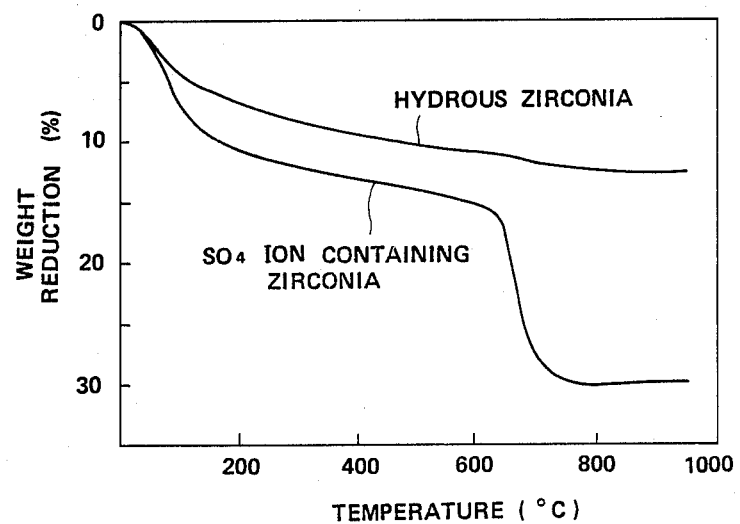
FIG. 3 shows the result of thermogravimetric analysis for powder composed of flaky hydrous zirconia fine crystals according to this invention.

As shown in the charts of FIG. 4(a), and (b), although no substantial change is observed in the powder X-ray diffractometry chart before and after the aging, there is a significant difference in the result of the thermogravimetric analysis thereof and, as shown in FIG. 3 for the comparison, those crystals after the aging show no substantial reduction in the weight due to the release of $SO_3$ near 650° C. It is further important that the flaky shape can be maintained as it is even after the aging and high temperature treatment.

The flaky hydrous zirconia fine crystals according to the present invention can be obtained as individually disintegrated crystal particles with no agglomeration by applying drying after the substitution of water with an organic solvent or by freeze drying. Furthermore, these crystals are converted into flaky fine particles of tetragonal or cubic zirconia crystals by calcining at a temperature higher than 600° C., preferably from 700° to 1300° C. and more preferably from 800° to 1100° C., and it is also possible to apply heat treatment to these crystals by mixing them with a carbonaceous material in the same way as described above with respect to the flaky $SO_4$ ion containing zirconia fine crystals. Furthermore, it is also possible to cause $Y_2O_3$, CaO, MgO, etc. to be present together in this case to obtain solid-solubilized products thereof, that is, stabilized or partially stabilized flaky zirconia fine crystals.

The fourth flaky zirconia type fine crystals of the present invention are flaky zirconia fine crystals having a tetragonal or cubic crystal lattice, and these crystals can be obtained by calcining the above-said hydrous zirconia fine crystals.

Surprisingly, the flaky hydrous zirconia fine crystals according to the present invention can still be tetragonal or cubic crystals (zirconia crystals) (as shown in FIG. 4(c), (d)) and the particles can maintain the flaky shape even after the heat treatment at a high temperature of 1000° C. without adding $Y_2O_3$ or other like stabilizers. Particularly, it is extremely unique that as crystal particles they maintain tetragonal or cubic crystal form without transforming into monoclinic zirconia upon calcination at 1000° C. as shown in FIG. 4(d). Since the flaky $SO_4$ ion containing zirconia (the first flaky zirconia type fine crystals) is transformed into monoclinic zirconia by heat treatment at 1000° C. as shown in FIG. 4(e) in the same manner as ordinary zirconia hydroxide, it is also noticeable from an academic point of view.

The flaky zirconia type fine crystal particles according to the present invention are suitable as the main or auxiliary materials for film or sheet-like ceramics, because they tend to be oriented upon forming, exhibit strength even in extremely thin films and exhibit decreased shrinkage in surface area upon calcining so as to prevent the occurrence of cracking or warping. Further, these crystals exhibit a peculiar effect when used as the starting material for PZT and like other piezoelectric ceramics. The piezoelectric crystals formed by the reaction with the zirconia tend to be oriented due to the flaky nature of the zirconia thereby enhancing performance. Furthermore, since sols or slurries containing these fine particles suspended therein tend to be oriented upon coating on a solid surface, they are extremely important for use as a surface treatment on ceramics, as well as for use in usual coating materials, paint fillers, cosmetics, rust-inhibiting paints, oxidation resistant and heat resistant paints and the like.

The present invention will be further explained more specifically by referring to the following examples but the invention is in no way limited to the following examples.

EXAMPLE 1

Reagent grade zirconyl carbonate was dissolved in sulfuric acid to prepare an aqueous solution of zirconium sulfate. The concentration of the solution was about 1.0 mol/liter of Zr and about 1.5 mol/liter of $H_2SO_4$ with the pH being less than 1. The solution was tightly closed in a teflon vessel and subjected to heat treatment at 200° C. for 4 days in an autoclave to obtain a white precipitate as a colloidal suspension. When observing this under a transmission electron microscope after water washing with water and drying, fine particles of a hexagonal flaky shape were observed having the size in the direction parallel to the plane of lamellar layers of greater than about 1000 Å and a thickness of about 70 Å.

According to chemical analysis, the chemical composition of the flaky fine crystals approximately corresponded to $Zr_5O_8(SO_4)_2 \cdot nH_2O$.

The weight change under heating of the flaky $SO_4$ ion containing fine crystals is as shown in FIG. 1, in which the most of water was removed up to about 200° C. and then the crystals were decomposed through desulfurization near 650° C.

Further, the results of powder X-ray diffractometry (CuKα) for the flaky $SO_4$ ion containing fine crystals is as shown in the chart of FIG. 2(a), in which most of the main peaks, other than the peaks of $2\theta$ near 8° showing the lamellar structure, are substantially at identical positions as compared to those of tetragonal or cubic $ZrO_2$ fine particles (FIG. 2(e)). The fine crystals are thermally stable even after calcining for two hours at a temperature of 600° C. and, as shown in FIG. 2(b), only the peaks near 8° change to a somewhat higher angle but the other peaks do not show a substantial change in position and intensity. While the products heat treated at 700° C. are converted into monoclinic zirconia by desulfurization as shown in FIG. 2(c), the monoclinic zirconia particles completely maintain the flaky shape under the observation of a transmission electron microscope.

EXAMPLE 2

Aqueous ammonia was added to reagent grade zirconia chloride to prepare precipitates of zirconium hydroxide, which were sufficiently washed with water and then incorporated with concentrated sulfuric acid to form a clear aqueous solution. An aqueous solution with a Zr concentration of 0.5 mol/liter and a $H_2SO_4$ concentration of 1.0 mol/liter and an aqueous solution with a Zr concentration of 0.25 mol/liter and a $H_2SO_4$ concentration of 0.5 mol/liter were respectively prepared therefrom. When these solutions were tightly closed respectively in teflon vessels and processed at 200° C. for three days in an autoclave, white precipitates as colloidal suspensions were obtained respectively. According to chemical analysis, electron microscopic observation and powder X-ray diffractometry, the former suspension had substantially the identical chemical composition, crystallinity and particle size as those obtained in Example 1, while the latter suspension consisted of flaky fine crystals having an identical crystal structure, disc-like shape and substantially the same chemical composition although having somewhat poor crystallinity characteristics as shown in FIG. 2(d). The zirconia obtained by desulfurization by heat treatment at 900° C. can completely maintain its flaky shape.

EXAMPLE 3

Reagent class zirconyl carbonate was dissolved in sulfuric acid to prepare an aqueous solution of zirconium sulfate. The concentration of Zr was 0.25 mol/liter and that of $H_2SO_4$ was about 0.5 mol/liter in the solution with the pH being less than 2.0. The solution was tightly closed in a teflon vessel and subjected to a heat treatment at 200° C. for two days in autoclaves to obtain white precipitates as colloidal suspensions. The precipitates were $SO_4$ ion containing lamellar compounds containing about 0.4 mol of $SO^4$ ion per one Zr g atom.

The white precipitates were suspended in a 1N aqueous ammonia solution and aged at 97° C. over two days and nights.

The products thus obtained were washed with water and dried. When a portion of these products was observed under a transmission electron microscope, it comprised a plurality of flaky fine particles (flaky hydrous zirconia fine crystals) with a size in a direction parallel to the plane of lamellar layers of about 1000 Å and a thickness of about 70 Å. According to the chemical analysis, the amount of $SO_4$ ions was reduced to about 0.05 mol per one Zr g atom. However, as shown in the charts of FIGS. 4(a), and (b), the results of powder X-ray diffractometry were substantially the same as between the $SO_4$ ion containing compound (a) before aging and the desulfurized product (b) after aging.

While the powder calcined at 700° C. in air was transformed into tetragonal or cubic zirconia as shown in FIG. 4(c), the outer particle shape was extremely flaky under the observation of a transmission electron microscope and the plate thickness was less than 200 Å, which was identical with that determined from the half-value width in the resulting chart of powder X-ray diffractometry. While the flaky $SO_4$ ion containing zirconia before aging was transferred into monoclinic zirconia after heat treatment at 1000° C. in the same manner as in ordinary tetragonal zirconia fine particles (FIG. 4(e)), the flaky hydrous zirconia according to the present invention produces tetragonal or cubic zirconia crystals even after the calcination at 1000° C. (FIG. 4(d)), in which there was no substantial change in the particle shape.

What is claimed is:

1. Flaky zirconia fine crystals having a lamellar structure with layers, having a thickness of less than 500 angstroms, and having a size in a direction parallel to the plane of said layers of greater than five times that of said thickness, wherein said lamellar structure is indicated near 8° on a two theta baseline from the results of powder X-ray diffractometry.

2. Flaky $SO_4$ ion-containing zirconia fine crystals as defined in claim 1, wherein said $SO_4$ ion-containing zirconia fine crystals contain mainly Zr metal ions and $SO_4$ ions in an amount of about 2/5 of the number of Zr ions, have a crystallographically 6- or 3-fold axis of symmetry perpendicular to the plane of the lamellar layers, have a structure such that the relative positions of Zr and O are similar to the relative positions in $ZrO_2$ crystals, and exhibit several main peaks in a chart of the results of powder X-ray diffractometry at substantially identical positions as compared to peak positions of tetragonal or cubic $ZrO_2$ crystals.

3. Flaky hydrous zirconia fine crystals having a lamellar structure with layers, having a thickness of less than 500 angstroms, and having a size in a direction parallel to the plane of layers of greater than five times that of said thickness, wherein said hydrous zirconia crystals comprise metal ions mainly of Zr and anions mainly of O, have a structure such that the relative positions between Zr and O are similar to the relative positions in $ZrO_2$ crystals, and exhibit several main peaks in a chart of the results of powder X-ray diffractometry substantially at identical positions as compared to peak positions of tetragonal or cubic $ZrO_2$ crystals.

4. Flaky desulfurized zirconia fine crystals having a lamellar structure with layers, having a thickness of less than 500 angstroms, and having a size in a direction parallel to the plane of said layers of greater than five times that of said thickness, wherein said desulfurized zirconia crystals have a monoclinic crystal lattice structure.

5. Flaky tetragonal zirconia fine crystals having a lamellar structure with layers, having a thickness of less than 500 angstoms, and having a size in a direction parallel to the plane of layers of greater than five times that of said thickness, wherein said tetragonal zirconia crystals have a tetragonal or cubic crystal lattice structure.

6. A method of producing flaky $SO_4$ ion-containing zirconia fine crystals which comprises treating with heat an aqueous acidic solution having a pH of less than 2 and containing from 0.1 to 1.5 g atom/liter of a soluble zirconium salt as Zr and from 0.2 to 3 g ion/liter of $SO_4$ ions, in a molar ratio of $SO_4$/Zr of higher than one, at a heat treatment temperature of from 110° to 350° C. so as to obtain flaky $SO_4$ ion-containing zirconia fine crystals,
wherein said $SO_4$ ion-containing zirconia crystals have a lamellar structure with layers, a thickness of less than 500 angstoms, and a size in a direction parallel to the plane of layers of greater than five times that of said thickness, and wherein said lamellar structure is indicated near 8° on a two theta baseline from the results of powder X-ray diffractometry, and wherein said $SO_4$ ion-containing zirconia mainly contain Zr metal ions and $SO_4$ ions in an amount of about 2/5 of the number of Zr ions, have a crystallographically 6- or 3-fold axis of symmetry perpendicular to the plane of lamellar layers, have a structure such that the relative positions of Zr and O are similar to the relative positions in $ZrO_2$ crystals, and exhibit several main peaks in a chart of the results of powder X-ray diffractometry at substantially identical positions as compared to peak positions of tetragonal or cubic $ZrO_2$ crystals.

7. A method of producing flaky desulfurized zirconia fine crystals which comprises desulfurizing the flaky $SO_4$ ion-containing zirconia fine crystals produced according to claim 6 by heating said zirconia fine crystals at a temperature higher than 600° C. so as to obtain flaky desulfurized zirconia fine crystals having a lamellar structure with layers, having a thickness of less than 500 angstoms, and having a size in a direction parallel to the plane of layers of greater than five times that of said thickness, wherein said desulfurized zirconia crystals have a monoclinic crystal lattice structure.

8. A method of producing flaky hydrous zirconia fine crystals which comprises subjecting the flaky $SO_4$ ion-containing zirconia fine crystals produced according to claim 6 to an aging treatment in a basic aqueous solution having a pH of higher than 8 at a temperature of from 20° to 150° C. to substitute and remove $SO_4$ ions so as to obtain flaky hydrous zirconia fine crystals having a lamellar structure with layers, having a thickness of less than 500 angstroms, and having a size in a direction parallel to the plane of layers of greater than five times that of said thickness, wherein said hydrous zirconia crystals comprise metal ions mainly of Zr and anions mainly of O, have a structure such that the relative positions between Zr and O are similar to the relative positions in $ZrO_2$ crystals, and exhibit several main peaks in a chart of the results of powder X-ray diffractometry substantially at identical positions as compared to peak positions of tetragonal or cubic $ZrO_2$ crystals.

9. A method of producing flaky tetragonal zirconia fine crystals which comprises calcining the flaky hydrous zirconia fine crystals produced according to claim 8 at a temperature of from 400° to 1300° C. so as to obtain flaky tetragonal zirconia fine crystals having a lamellar structure with layers, having a thickness of less than 500 angstoms, and having a size in a direction parallel to the plane of layers of greater than five times that of said thickness, wherein said tetragonal zirconia crystals have a tetragonal or cubic crystal lattice structure.

10. Flaky zirconia fine crystals as defined in claim 2, wherein said zirconia fine crystals exhibit a stable crystal structure up to a temperature of 600° C.

11. Flaky hydrous zirconia fine crystals as defined in claim 3, wherein said hydrous zirconia crystals have a thickness of less than 200 angstroms and have a flaky particle shape which remains stable up to a temperature of about 700° C.

12. Flaky desulfurized zirconia fine crystals as defined in claim 4, wherein said desulfurized zirconia crystals are obtained by desulfurizing the flaky $SO_4$ ion-containing zirconia fine crystals as defined in claim 2 at a temperature higher than 600° C.

13. Flaky desulfurized zirconia fine particles which comprise flaky desulfurized zirconia fine crystals as defined in claim 4 and an additional component selected from the group consisting of $Y_2O_3$ and CaO, wherein said particles are in the form of a hexagonal or disc-like plate shape.

14. Flaky tetragonal zirconia fine crystals as defined in claim 5, wherein said tetragonal zirconia crystals are obtained by calcining the flaky hydrous zirconia fine crystals of claim 3 at a temperature of from 400° to 1300° C.

15. Flaky tetragonal zirconia fine crystals as defined in claim 5, wherein said thickness is less than 200 angstroms.

16. The method as defined in claim 8, wherein said temperature is from 70° to 110° C.

17. The method as defined in claim 16, wherein said temperature is from 95° to 100° C.

18. The method as defined in claim 9, wherein said temperature is from 800° to 1100° C.

* * * * *